United States Patent Office

3,555,104
Patented Jan. 12, 1971

3,555,104
ALKYLATION OF C₉ METHYL-SUBSTITUTED BENZENES
Gerald Sugerman, Parsippany, N.J., assignor to Sun Oil Company, Philadelphia, Pa., a corporation of New Jersey
No Drawing. Continuation-in-part of application Ser. No. 797,313, Dec. 30, 1968, which is a continuation-in-part of application Ser. No. 761,211, Sept. 20, 1968. This application Dec. 15, 1969, Ser. No. 885,320
Int. Cl. C07c 5/24
U.S. Cl. 260—671         9 Claims

ABSTRACT OF THE DISCLOSURE

In the alkylation of $C_9$ methyl-substituted benzenes by means of methyl chloride or bromide in the presence of an aluminum chloride catalyst to produce tetramethylbenzenes, the ratio of isodurene to durene in the product is increased by incorporating a small amount of soluble iron in the reaction mixture.

CROSS-REFERENCE TO RELATED APPLICATIONS

This application is a continuation-in-part of application Ser. No. 797,313, filed Dec. 30, 1968, which in turn is a continuation-in-part of Ser. No. 761,211, filed Sept. 20, 1968, both of which are now abandoned.

This invention relates to the catalytic liquid phase alkylation of $C_9$ methyl-substituted benzenes in the presence of an aluminum chloride catalyst to produce tetramethylbenzenes. The invention particularly involves the use of a soluble iron compound to alter the reaction product composition so as to increase the ratio of isodurene to durene in the product.

The use of aluminum chloride as a catalyst for the alkylation of methyl-substituted benzenes is well known. (See, for example, U.S. Patent Nos. 2,976,335 and 3,031,513). Wide proportions of aluminum chloride to hydrocarbon feed, such as from 0.015% to 100% on a molar basis, have been disclosed but amounts in the range of 4–50% usually have been recommended. In the present process, low or high proportions of aluminum chloride can be utilized but it is generally advantageous to employ a relatively small proportion of aluminum chloride, e.g., 1.0 to 3.0 mole percent and preferably about 1.5 to 2.5 mole percent based on the aromatic hydrocarbon feed. By employing such low amount of aluminum chloride, the catalyst need not be recovered for reuse. Furthemore, the hydrocarbon product will contain only a small amount of organic chlorides, so that an acceptable product is obtained merely by water washing the reaction mixture effluent. The need for an alkaline hydrolysis step, which is normally required when a high proportion of aluminum chloride is used, is thus avoided.

Feedstocks for the present process are the $C_9$ methyl-substituted benzenes, viz. pseudocumene, mesitylene, hemimellitene, the three ethylmethylbenzenes or any mixtures thereof. The alkylating agent is methyl chloride or bromide, preferably the chloride.

In accordance with the invention, it has been found that in the alkylation of such feedstocks to form tetramethylbenzenes the presence of ferric chloride in the reaction mixture results in an increase in the ratio of isodurene to durene in the reaction product.

Isodurene is a valuable intermediate which can be used to prepare corresponding acids, nitriles, amines and alcohols which have lower melting points than those of the analogous durene derivatives.

The iron compound preferably is used in conjunction with the low concentrations of aluminum chloride catalyst heretofore described. However, the addition of ferric ions is effective for increasing the isodurene:durene ratio even when high catalyst concentrations are used, e.g. 15% $AlCl_3$.

The reaction can be carried out batchwise or as a continuous process, as will be readily apparent to those skilled in the art. Particular reaction conditions depend on the feedstock employed and may be readily optimized. Temperatures may range from 65° C. to 160° C., preferably from 100° C. to 150° C. Sufficient pressure is used to maintain a liquid phase.

The reaction time required varies depending largely on the temperature employed. The reaction can be considered to occur in two stages, the first stage being alkylation and the second stage, which starts after alkylation is complete, being equilibration. The alkylation time ranges from 10 to 180 minutes depending on the reactants and conditions employed. The subsequent equilibration period ranges from 10 to 60 minutes, preferably 15 to 45 minutes. The equilibration period, during which continued isomerization-transalkylation occurs, is the time required to obtain a reaction product which is substantially a thermodynamic equilibrium mixture.

The particular source of the iron is unimportant, so long as it forms ferric chloride in the reaction medium. Halides, such as the chlorides, are particularly useful, but other materials including both these which are soluble, such as the organic salts (e.g., ferric acetate and ferric naphthenate), and those which are insoluble may be used. Insoluble materials such as elemental iron, preferably in powdered form, or iron oxides may also be used, the essential factor being that they form ferric chloride in the reaction mixture.

The amount of the ferric compound may vary widely. Effect on the isodurene to durene ratio may be noted with as little as 3 p.p.m. Generally, less than 10,000 p.p.m. would be used. Preferred amounts are from 10 to 1000 p.p.m.

The invention is specifically illustrated by examples given below. In preparation for carrying out these examples, a catalyst complex is prepared by saturating a vigorously stirred suspension of powdered anhydrous aluminum chloride in 250 mole percent of pseudocumene with hydrogen chloride. The resulting heavy oil, which is covered with a slight film of excess oil phase, is completely formed within an hour. Excess hydrogen chloride is removed by nitrogen sparging and the product is stored in the dark at ambient temperature under a vented drying tube. Catalyst is prepared in a flask provided with a sparge tube, a mechanical stirrer, and a gas outlet tube. Hydrogen chloride is supplied from a cylinder equipped with a metering valve. Catalyst so prepared showed a hydrocarbon to aluminum chloride molar ratio in the catalyst layer of about 2.35.

Each example is carried out by placing 10 moles of pseudocumene in a reactor provided with a stirrer, a sparger for the introduction of methyl chloride, and means for heating and controlling the temperature at the selected level. Example 1 is a control run in which no iron compound was added, made in order to show typical isodurene to durene ratios obtained in the absence of any soluble iron component.

Example 1

A catalyst complex which contains 0.16 mole of aluminum chloride is added to 1100 grams of preheated pseudocumene feed. This is equivalent to about 10 moles of pseudocumene. The aluminum chloride to pseudocumene molar ratio is 0.016. The temperature during the addition of the methyl chloride and during the reaction is 137° C. A total of 9.35 moles of the methyl chloride are absorbed by the reaction mixture over a period of one hour and twenty minutes. The alkylation time is eighty minutes and total equilibration time after the addition of all of the methyl chloride is sixty minutes. At the end of the run, the reaction is stopped by rapid cooling, the oil and catalyst layers are separated and the oil phase is washed with water. Analysis of the product shows less than one part per million of residual chloride. Table 1 gives hydrocarbon analyses, expressed in weight percent, of reaction product samples at 0, 15 and 60 minutes equilibration times and also the resulting isodurene:durene ratios.

TABLE 1.—PRODUCT COMPOSITION, WT. PERCENT

|  | 0 minutes | 15 minutes | 60 minutes |
|---|---|---|---|
| Xylenes | 7.4 | 5.6 | 3.0 |
| Trimethylbenzenes: |  |  |  |
| 1,3,5 | 7.2 | 6.3 | 5.8 |
| 1,2,4 | 24.0 | 19.1 | 14.4 |
| 1,2,3 | 1.7 | 1.1 | 1.3 |
| Tetramethylbenzenes: |  |  |  |
| 1,2,4,5 (durene) | 16.7 | 24.3 | 30.7 |
| 1,2,3,5 (isodurene) | 14.3 | 19.8 | 26.3 |
| 1,2,3,4 | 4.5 | 4.6 | 4.6 |
| Pentamethylbenzenes | 15.0 | 16.2 | 12.2 |
| Hexamethylbenzene | 8.0 | 2.1 | 0.3 |
| Ratio isodurene=durene | 0.86 | 0.82 | 0.85 |

The data in Table 1 indicate that under the alkylating conditions used in the absence of a soluble iron compound, an isodurene to durene ratio of the order of 0.85 is typical.

Examples 2–4

In these examples, three alkylation reactions are performed following essentially the same procedure as described in Example 1. In these runs, the amount of aluminum chloride catalyst complex charged is about 0.06 mole per mole of pseudocumene. The temperature during the addition of the methyl chloride and during the soak period thereafter is 127° C. After the addition of the methyl chloride, the reaction mixture is permitted to soak for a period of 30 minutes.

In the first run, 3 p.p.m. of ferric chloride, calculated as iron, are present in the system along with the aluminum chloride catalyst. The second and third runs contain 12 and 100 p.p.m., respectively. Table 2 shows the compositions of the products and the isodurene:durene ratios obtained:

TABLE 2.—PRODUCT COMPOSITION, WT. PERCENT

|  | FeCl₃ added, p.p.m. | | |
|---|---|---|---|
|  | 3 | 12 | 100 |
| Xylenes | 2.1 | 4.4 | 1.6 |
| Trimethylbenzene: |  |  |  |
| 1,3,5 | 6.9 | 9.0 | 4.3 |
| 1,2,4 | 12.4 | 16.6 | 8.9 |
| 1,2,3 | 1.4 | 1.7 | 0.7 |
| Tetramethylbenzene: |  |  |  |
| 1,2,4,5 (durene) | 30.1 | 28.2 | 29.4 |
| 1,2,3,5 (isodurene) | 24.9 | 27.0 | 34.6 |
| 1,2,3,4 (prehnitene) | 4.88 | 3.9 | 3.6 |
| Pentamethylbenzene | 18.9 | 7.7 | 17.0 |
| Hexamethylbenzene | 0.5 | 0.1 | 0.4 |
| Ratio isodurene=durene | 0.83 | 0.96 | 1.18 |

These data clearly illustrate the marked increase in the isodurene to durene ratio resulting from the addition of the ferric compounds.

Examples 5–6

In these examples, two alkylation reactions are performed following essentially the same procedure as described in Example 1. In these runs, 0.02 mole of aluminum chloride complex is charged for each mole of pseudocumene. The temperature during the addition of the methyl chloride and during the soak period thereafter is 136° C. After the addition of methyl chloride, the reaction mixture is permitted to soak for a period of 30 minutes.

In the first run, 50 p.p.m. of ferric oxide calculated as iron are added in the system along with the aluminum chloride catalyst. The second run contains 2000 p.p.m. of ferric nitrate calculated as iron. Table 3 shows the composition of the products and the isodurene:durene ratios obtained.

TABLE 3.—PRODUCT COMPOSITION, WT. PERCENT

|  | Fe added, p.p.m. | |
|---|---|---|
|  | 50 | 2,000 |
| Xylenes | 1.9 | 2.0 |
| Trimethylbenzene | 20.4 | 21.2 |
| Tetramethylbenzenes: |  |  |
| 1,2,4,5 (durene) | 30.1 | 26.4 |
| 1,2,3,5 (isodurene) | 33.0 | 27.5 |
| 1,2,3,4 (prehnitene) | 5.0 | 4.2 |
| Pentamethylbenzene | 9.6 | 8.6 |
| Hexamethylbenzene | 0.1 | 0.1 |
| Ratio isodurene:durene | 1.1 | 1.4 |

The increase in isodurene:durene ratio shown by Table 3 in the second run as compared to the first is attributable to the higher iron content in the second. Both runs, when compared to the data in Table 1, illustrate the distinct increase in isodurene content of the product that can be secured by incorporating an iron compound in the reaction mixture.

Similar increases in the isodurene:durene ratio are effected by the presence of soluble iron in the reaction mixture when other $C_9$ methyl-substituted benzenes are used in place of pseudocumene.

The invention claimed is:

1. In a process for the alkylation of a $C_9$ methyl-substituted benzene with methyl chloride or bromide wherein the reaction is performed in the liquid phase at a temperature in the range of 65–160° C. in the presence of an aluminum chloride catalyst, the improvement which comprises carrying out the alkylation reaction in the presence of soluble iron in amount effective to increase the isodurene-durene ratio of the reaction product.

2. The process of claim 1 wherein the amount of soluble iron present is in the range of 3–10,000 p.p.m.

3. The process of claim 1, wherein the soluble iron is added to the reaction in the form of a ferric salt.

4. The process of claim 3 wherein the ferric salt is ferric chloride.

5. The process of claim 1 wherein the $C_9$ methyl-substituted benzene comprises pesudocumene.

6. In a process for the alkylation of a $C_9$ methyl-substituted benzene with methyl chloride wherein the reaction is performed in the liquid phase at a temperature in the range of 100–150° C. in the presence of an aluminum chloride catalyst, the improvement which comprises carrying out the alkylation using a catalyst level of 1 to 3 mole percent of aluminum chloride based on the $C_9$ methyl-substituted benzene and in the presence of an amount of soluble iron in the range of 3–10,000 p.p.m. sufficient to increase the isodurene-durene ratio of the reaction product.

7. The process of claim 6 wherein the amount of soluble iron present is in the range of 10–1000 p.p.m.

8. The process of claim 6 wherein the soluble iron is added to the reaction in the form of a ferric salt.

9. The process of claim 8 wherein the ferric salt is ferric chloride.

References Cited

UNITED STATES PATENTS 2,909,575  10/1959  Saffer et al.
3,219,720  11/1965  Binder et al.
3,275,290  3/1968  Smeykal et al.

CURTIS R. DAVIS, Primary Examiner

U.S. Cl. X.R.

260—668